K. T. STRICKLAND 2,942,256

RADAR CALIBRATION SYSTEM

Filed May 16, 1955

INVENTOR.
KENNETH T. STRICKLAND
BY
ATTORNEY

United States Patent Office 2,942,256
Patented June 21, 1960

2,942,256

RADAR CALIBRATION SYSTEM

Kenneth T. Strickland, Haddonfield, N.J., assignor to Radio Corporation of America, a corporation of Delaware Filed May 16, 1955, Ser. No. 508,691

17 Claims. (Cl. 343—17.7)

The present invention relates in general to an improved phase measuring system and in particular to an improved arrangement for manually or automatically calibrating direct-reading radar and radio altimeter systems.

In a radio altimeter system wherein pulsed or continuous wave energy is transmitted to the earth and received after reflection from the earth, the difference in time between the transmission and reception of the energy is a function of height of the altimeter. In such systems and in other relatively high accuracy radar type systems, particularly of the direct reading type, it is desirable periodically to check the system calibration to insure that the indicated delay is proportional to the actual distance of the reflecting target. This is because changing conditions of ambient temperature and changing circuit parameters of the wave transmitting and receiving equipment may introduce extraneous delays which make the indicated delay readings inaccurate.

One known method of calibrating a direct reading radio altimeter is to apply the transmitted wave directly to the receiver thereby eliminating the delay path from transmitter-to-ground-to-receiver. The direct reading indicator of the altimeter is thereby driven by the time delay (distance) measuring circuits until the indicator reads approximately zero feet of altitude. If the indicator does not read zero feet of altitude, there are errors in the system and these are eliminated by manually adjusting time delay compensating circuits in the altimeter.

One of the disadvantages of this calibration method is the relatively long time required for calibration—as long as 2 minutes or more at the extreme range of the altimeter. This includes the time required for the direct reading device to be driven from the altitude indicated immediately before calibration to approximately zero altitude and then back to the corrected altitude, and the time required for manual adjustment. Another disadvantage is that during the calibration interval the altitude indication is useless.

It is an object of the present invention to provide an improved calibration arrangement for a pulse-echo system such as a direct reading radio altimeter.

It is a more general object of the present invention to provide an improved, highly accurate arrangement for comparing the phase of one wave with that of another wave.

It is another object of the present invention to provide an improved radio altimeter calibration system which may be either manually or automatically operated and which operates extremely rapidly.

It is another object of the present invention to provide, for a direct reading pulse-echo system, an improved calibration system which permits fairly accurate distance readings to be made during the calibration interval.

An altimeter embodiment of the present invention includes a pair of delay loops, one including the changeable delay path from transmitter-to ground-to receiver and the other including a time delay (distance) measuring circuit such as a goniometer or the like. The outputs of the two loops are compared in a phase comparison circuit and when they are different in phase a control signal is developed which is employed in a feedback servo loop to drive the goniometer in the correct sense to reduce the control signal to zero. During calibration, the transmitted signal is applied directly to the receiver of the altimeter. Simultaneously the goniometer is bypassed. If now the fixed delays introduced by both delay loops are equal, there will be no control signal output from the comparison circuit means. If, however, due to changing ambient conditions or changing circuit parameters the fixed delay introduced by one of the loops becomes unequal to the fixed delay introduced by the other of the loops the comparison circuit produces a control signal. This control signal is applied to the above mentioned servo feedback loop which, in turn, drives, solely during the calibration interval, a compensating delay device in one of the loops in the proper sense to render the fixed delays introduced by both loops the same.

The goniometer of the system is connected to a direct reading indicator. In the system of the invention as described so far, if the goniometer and indicator were disconnected during calibration, the indicator would continue to indicate the same altitude during calibration as immediately prior to calibration. At the termination of the calibration interval the goniometer and direct reading indicator would indicate the correct altitude. In a preferred form of the invention, during the calibration interval the goniometer and direct reading device are driven, and therefore corrected, at the same time as the compensating delay device. The direction and extent of drive are such that the direct reading device indicates the approximately correct altitude during calibration.

The invention will be described in greater detail by reference to the following description taken in connection with the accompanying drawing in which:

Figures 2a–2d' illustrate a number of waveforms of the circuit of Figure 1;

Figures 4a–4d' illustrate a number of waveforms of the circuit of Figure 3;

Figures 5a–5e' illustrate another series of waveforms useful in explaining the invention;

Throughout the figures like reference characters refer to like circuit elements.

Figure 1:
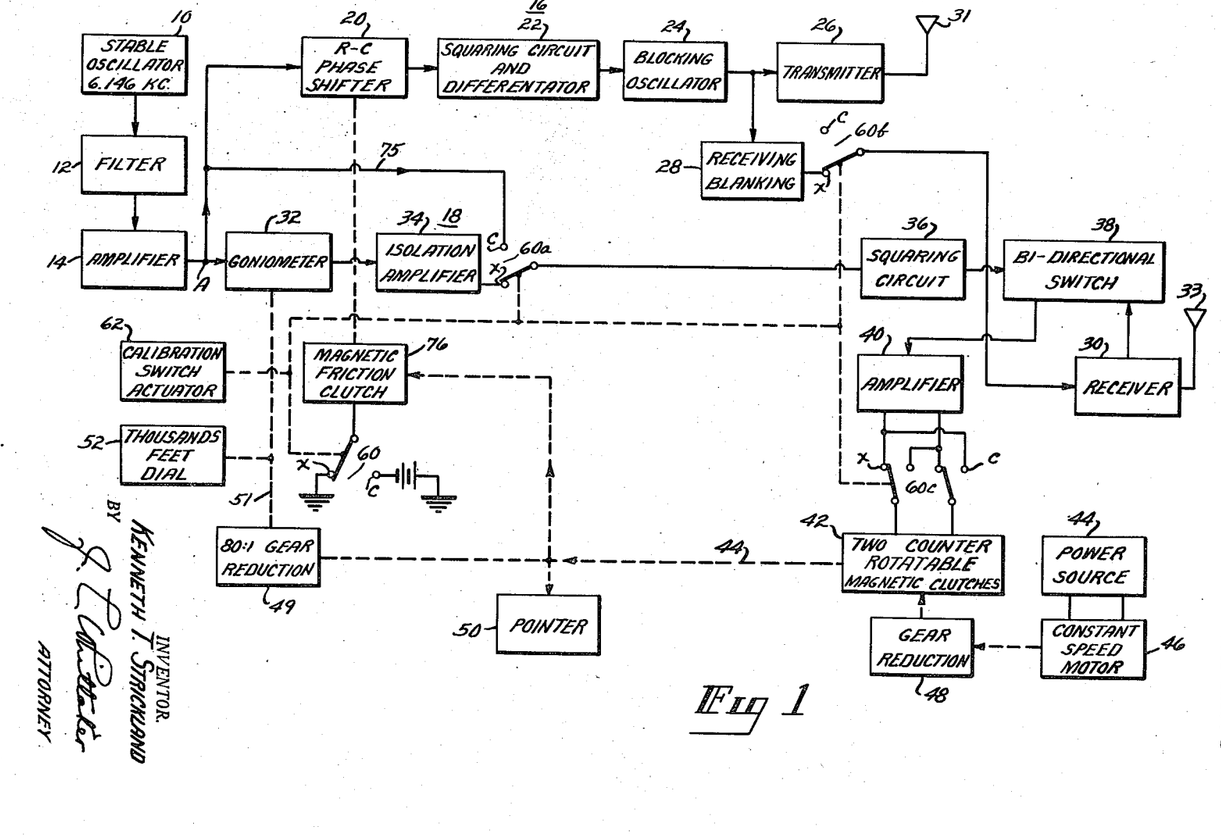
Figure 1 is a block circuit diagram of one form of the present invention.

Referring now to Figure 1, stable oscillator 10, preferably a crystal controlled or other, very stable frequency source, generates a reference wave at a frequency of 6.146 kc., hereinafter called 6 kc. This specific frequency is chosen as one complete cycle is equivalent to 80,000 ft. of radar range, a convenient altitude limit for a radio altimeter. It will be appreciated, of course, that the invention is not limited to a system having a maximum range of 80,000 ft. If greater or lesser ranges are desired, the frequency of source 10 may be changed accordingly.

Figure 5:
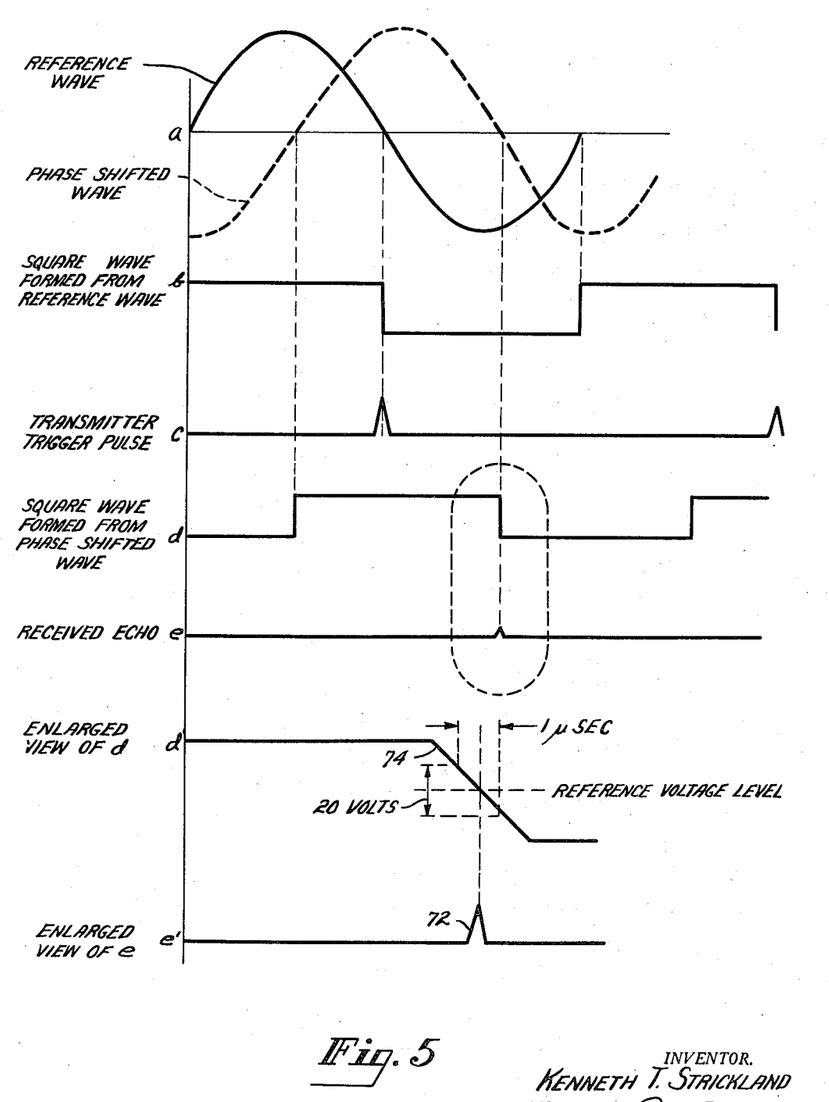

The output of oscillator 10 is applied through filter 12 and amplifier circuit 14 to a pair of time delay loops 16, 18. The function of the low-pass filter is to remove harmonics and that of the amplifier to increase the power level of the reference wave to a value sufficient to drive both loops. The first loop 16 includes an RC phase shifter 20 which may be neglected for the present, a squaring circuit and differentiator 22, blocking oscillator 24 and transmitter 26. All of these circuits, per se, are conventional. The squaring circuit converts a reference sinusoidal wave to a square wave and the differentiator produces pulses coincident with the negative-going edges of the square wave. The pulses trigger blocking oscillator 24 which applies modulating pulses to transmitter 26. The respective waveforms are shown in Figure 5 wherein the reference wave is shown at 5a in solid line, the square wave derived therefrom at 5b and the transmitter trigger pulse at 5c.

In order to prevent receiver saturation, the blocking oscillator output is applied to receiver blanking circuit 28 which in turn applies a blanking, gating pulse to receiver 30 during the time of transmission of pulses from transmitter 26.

The loop 16 also includes the delay path between transmitting antenna 31, the target (not shown), and receiving antenna 33, and the receiver 30.

Delay loop 18 includes goniometer 32 as the known, adjustable delay means thereof, and isolation amplifier 34 and squaring circuit 36 as the relatively fixed delay means thereof. Details of blocks 32 and 34 will be given later. As can be seen from Figure 5, the reference wave is phase shifted by goniometer 32 (see 5a, dashed line), and squaring circuit 36 converts this phase shifted wave to a square wave (see Figure 5d).

The outputs of loops 16 and 18 are applied to a comparison circuit shown in Figure 1 as a bi-directional switch 38. Details of the switch will be given later. The function of switch 38 is to compare the phase of an echo pulse with that of a portion of square wave produced by circuit 36. When the two are "in phase" the output of switch 38 is zero volts; however, when the two are out of phase the output is a direct voltage having a sense indicative of the sense of the difference in phase between the two inputs to the switch. This direct voltage is amplified by amplifier 40 and employed to actuate magnetic clutches 42.

Referring now to the lower right-hand portion of Figure 1, power source 44 continuously drives constant speed motor 46 in a given direction. Gear reduction 48 reduces the motor speed to a low value—30 revolutions per minute in one form of the invention. Depending upon the polarity of the output signal of amplifier 40, one or the other of the two magnetic, counter-rotatable clutches 42 is rendered operative. When one of the clutches is rendered operative, shaft 44 rotates in a clockwise direction in response to the mechanical output of motor 46 and when the other of the clutches is rendered operative, shaft 44 rotates in a counter-clockwise direction in response to the same mechanical output of motor 46. The clutches and D.C. amplifier will be described in further detail below.

Shaft 44 is coupled through an 80-to-1 gear reduction assembly 49 and shaft 51 to goniometer 32. It is preferable to use precision, anti-backlash gears for the 80-to-1 gear reduction assembly 49 since nonlinearity in these gears shows up as an error in the altitude indication. Shaft 51 continues to rotate until goniometer 32 adjusts the phase of the square wave output of circuit 36 in the proper sense and magnitude to render the output of bi-directional switch 38 equal to zero volts. When this occurs, the output shaft 44 of magnetic clutches 42 stops and the movement of the goniometer 32 is stopped. In a preferred form of the invention, output shaft 44 of magnetic clutches 42 is connected directly to a pointer 50. This pointer makes 80 revolutions for each revolution made by the goniometer. One goniometer revolution is, of course, equal to 360° of phase shift, which in turn is equal to 80,000 ft. of altitude. Accordingly, one revolution made by pointer 50 is equal to 1,000 ft. of altitude and 80 such revolutions are equal to 80,000 ft. of altitude.

The 80-to-1 gear reduction 49 is also connected to a dial 52 which indicates the thousands of feet.

The calibration system for the altimeter includes a plurality of ganged switches 60, 60a, 60b and 60c. The contacts C of the switches are in circuit during calibration and the contacts X of the switches are in circuit during normal altimeter operation. Switches 60–60c inclusive are actuated by calibration switch actuator means 62 which may include relay means and either a push button for actuating the relay or an automatic arrangement which automatically, periodically actuates the relay. The latter, for example, may be a motor having a slow moving cam which periodically connects a source of power to the relay, or may include an electrical, long time constant circuit which periodically actuates the relay. In all these cases switches 60–60c inclusive can be considered to be the ganged relay contacts of the relay in block 62.

Figure 2:
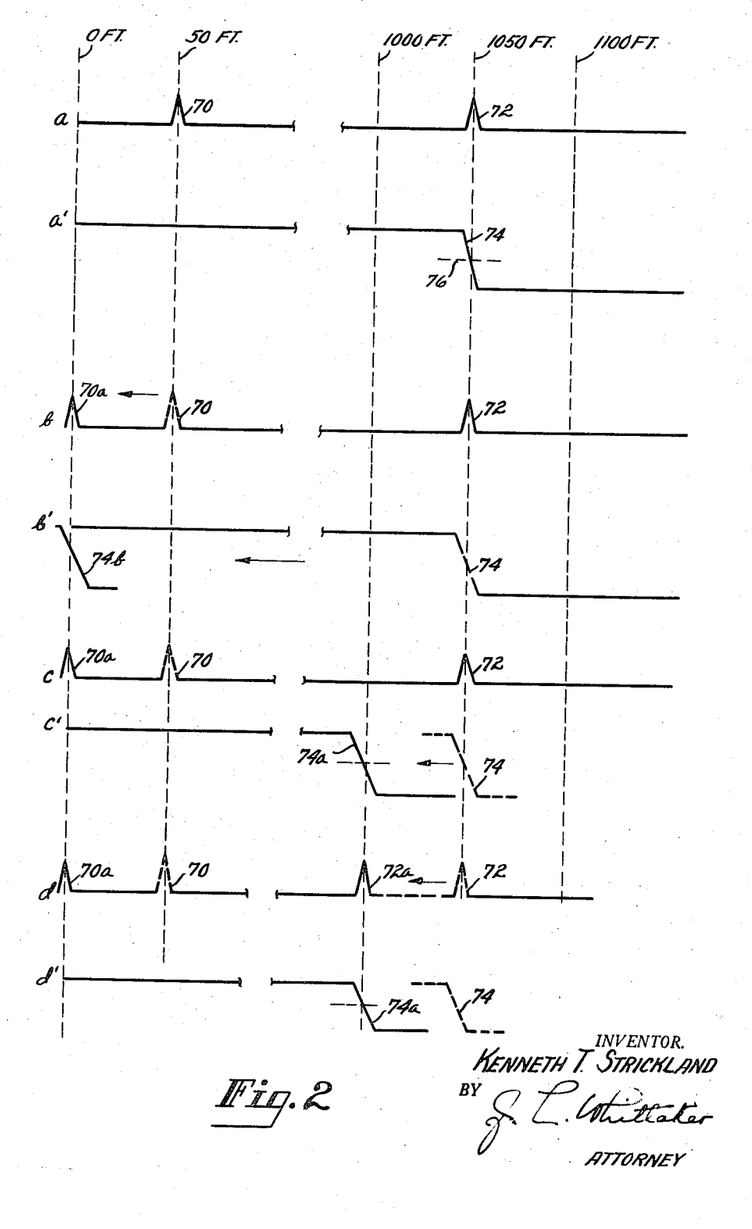

Although during calibration a number of things occur simultaneously and instantaneously, for the purposes of explanation these will be considered as occurring in a number of discrete steps. During the explanation which follows the waveforms in Figures 2a–2d' should be referred to as well as Figure 1.

Figures 2a and 2a' illustrate the operation of the system immediately prior to calibration. Due to delays introduced in transmitter loop 16 the transmitted pulse 70 is transmitted at a time equivalent to 50 ft. of altitude rather than zero ft. of altitude. In other words, there is some delay introduced in one or more of blocks 20, 22, 24, 26 and 30 which is equivalent to 50 ft. of radar range. This error may be assumed to have occurred since the last calibration of the system.

The earth is 1000 ft. below and therefore echo 72 appears at an apparent range of 1050 ft. (1000 ft. after the transmitted pulse 70). The negative-going edge 74 of the square wave is effectively delayed by goniometer 32 the equivalent of 1050 ft. of radar range thereby aligning the central portion 76 of this wave with pulse 72. (The phase comparison of waves 72 and 74 will be discussed in greater detail later in connection with the schematic circuit diagrams.) Pointer 50 and dial 52 together indicate 1050 ft. of altitude.

When calibration switch actuator 62 is energized, switch 60b moves to position C thereby removing the blanking from receiver 30. The transmitted pulse is sufficiently powerful to be fed directly through receiver 30 to bi-directional switch 38. At the same time switch 60a is thrown to position C and the goniometer 32 and isolation amplifier 34 are effectively by-passed by lead 75. The negative-going edge 74 of the square wave and the directly fed through transmitter pulse should now be aligned; however, as already mentioned, one or more of blocks 20, 22, 24, 26 or 30 introduces an extraneous delay equivalent to 50 ft. of radar range. Accordingly, there is a direct control voltage output from bi-directional switch 38.

During calibration, switch 60 moves to position C thereby actuating magnetic friction clutch 76. The direct voltage output of bi-directional switch 38 is applied through amplifier 40 to magnetic clutches 42 energizing the same. Constant speed motor thereby drives magnetic friction clutch 76 through magnetic clutches 42 in the proper sense to introduce a negative phase shift in loop 16. This is done by driving a resistor-condenser phase shifter 20 in the proper sense to make transmitted pulse 70 occur the time equivalent of 50 ft. earlier. The step is illustrated clearly in Figure 2b where it is shown that transmitted pulse 70, now shown by dashed lines, moves to position 70a. The short-circuiting of goniometer 32 moves wave 74 to 74b as shown in Figure 2b'.

It will be noted that moving pulse 70 to the left increases the apparent delay between pulse 70a and echo 72 from 1000 ft. to 1050 ft. Accordingly, if constant speed motor 46 were to rotate shaft 44 in its normal direction, this apparent increase of 50 ft. would cause an increase of 50 ft. in the apparent delay provided by goniometer 32 and the goniometer would read 1100 ft. rather than 1050 ft. In this connection, it will be noted that during calibration constant speed motor 46 is connected to goniometer 32 through stages 48, 42 and 49. Thus, during calibration the goniometer would indicate an erroneous altitude and this is undesirable—even though the altimeter would indicate the correct altitude after calibration.

Switch 60c compensates for the above effect. Its function is to reverse the polarity of the signal input to the clutches during calibration, thus reversing the direction of rotation of shaft 44 during calibration. Thus, instead of moving +50 ft. in response to the movement of transmitter pulse 70 to position 70a, the negative trailing edge 74 of the square wave moves −50 ft. to 74a as indicated in Figure 2c'. (Note that Figure 2c' illustrates wave 74a as it would appear the instant switch 60a was moved back to position X.) During calibration then, the direct reading indicator indicates the approximately correct altitude of the aircraft, that is, it indicates about 1000 ft.

When the calibration switch actuator 62 is deenergized, the radio altimeter resumes its normal mode of operation (see Figures 2d and 2d'). Now, however, the transmitted pulse is 70a and this occurs at the equivalent of zero ft. altitude. The target is at 1000 ft. and so echo pulse 72 moves from its former position to 72a. The negative trailing edge of the square wave is also at 74a. Any minor changes in altitude made by the aircraft during calibration now result in a small control signal output of switch 38a and this control signal drives pointer 50 and dial 52 to the precise aircraft altitude. If the fixed delay error were in the second loop, similar action to the one described above would take place.

Summarizing the calibration operation briefly, assume that actuator 62 is manually energized. The operator depresses a push button, the system automatically calibrates itself and pointer 50 and dial 52 indicate the approximately correct altitude of the aircraft. The operator releases the push button and dial 52 and pointer 50 indicate the precise altitude of the aircraft.

In the embodiment of Figure 1, the RC phase shifter 20 is positioned in loop 16. The inventive concept is, of course, also applicable to the case where fixed loop errors are compensated by adjustment of delay loop 18. One such arrangement is shown in Figure 3.

Figure 3:
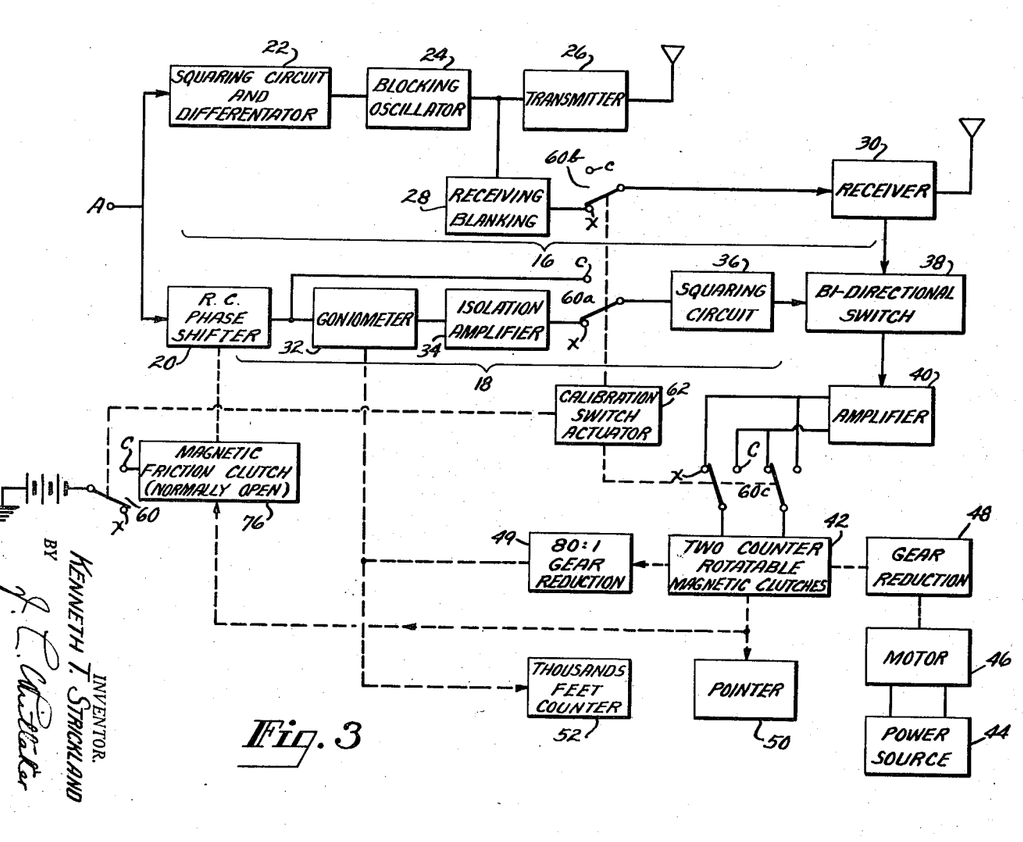
Figure 3 is a block circuit diagram of another embodiment of the present invention.
Figure 4:
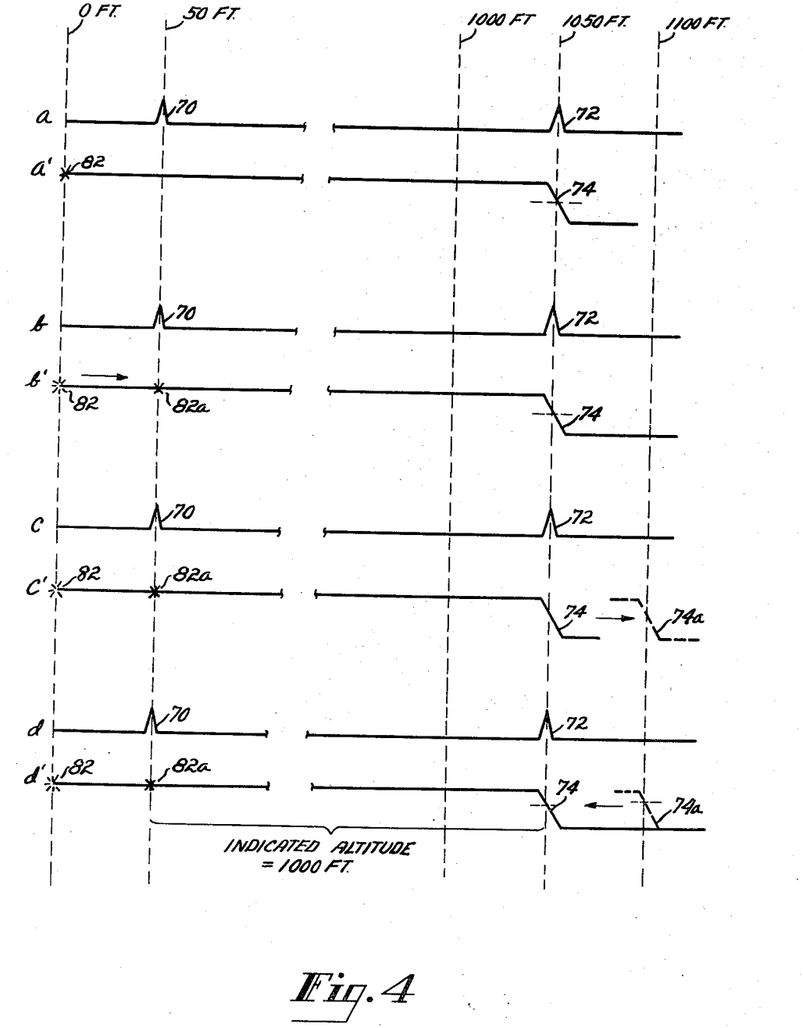

Referring now to Figure 3, the blocks bearing the same reference numerals as corresponding blocks in Figure 1 function in a similar manner and need not be described in further detail. The operation of the circuit during calibration may be better understood by referring to Figure 4. Figures 4a and 4a' illustrate the condition of the system before calibration. As in the embodiment of Figure 1, transmitted pulse 70 is delayed an extraneous 50 ft. and so the altitude indication is 1050 ft. rather than 1000 ft., the actual altitude of the aircraft. Upon energization of the calibration switch actuator 62, the transmitted signal is applied directly through receiver 30 to bi-directional switch 38. Similarly goniometer 32 and isolation amplifier 34 are by-passed. The phases of the directly received transmitted pulse and of the delayed square wave are compared in block 38 and a control signal developed which causes phase shifter 20 to be driven in the proper sense to introduce an additional 50 ft. of delay in loop 18. This is shown in Figure 4b' by movement of asterisk 82, corresponding to a given point on the reference wave, to the right to position 82a.

Movement of reference point 82 to 82a would normally cause motor 46 also to shift the goniometer setting so that wave 74 would move to position 74a as shown schematically in Figure 4c'. This, of course, would be disadvantageous since during the calibration interval in such case pointer 50 and dial 52 would indicate 1100 ft. of altitude. In order to avoid this situation, when the calibration switch actuator is energized, the input voltage to the magnetic clutches is reversed in polarity. Therefore the motor drives the goniometer in a direction opposite to the one expected whereby the pointer and dial indicate 1000 ft. rather than 1100 ft. In other words, rather than showing an increase of altitude of 50 ft. the direct reading indicators show a decrease in altitude of 50 ft. This is indicated schematically in Figure 4d' where it is seen that the distance between reference point 82a which occurs at 50 ft. and negative-going edge 74 of the square wave which occurs at 1050 ft. is 1000 ft.

When the calibration switch actuator is de-energized it will be seen from Figures 4d and 4d' that wave edge 74 is approximately coincident with the received echo pulse 72 and it will be remembered that the direct reading indicators now read 1000 ft. of altitude, the correct actual altitude of the aircraft. Any changes in altitude which have occurred during the calibration interval will now cause a control voltage output from bi-directional switch 38 which will drive the pointer, dial and goniometer in the correct sense to compensate for this change in altitude.

Figure 6:
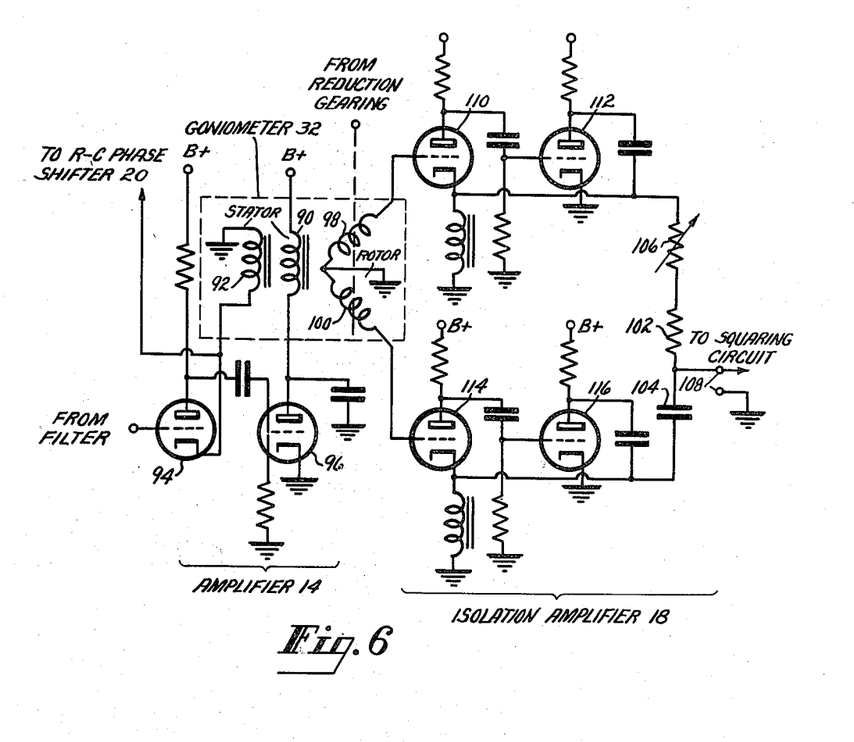
Figure 6 is a schematic circuit diagram of one portion of the invention shown in block form in Figures 1 and 3.

Details of the amplifier 14, goniometer 32 and isolation amplifier 18 are shown in Figure 6. Since these circuits are fairly conventional, they will be described only in brief. The goniometer itself may be considered a feedback-compensated induction resolver including a main stator winding 90 and a feedback stator winding 92. The point A on the diagram corresponds to the same point in Figure 1. The amplifier 14 is conventional and includes a first inversion triode 94 and a second triode 96. The feedback circuit is from stator winding 92 to the cathode of triode 94. Its function is to compensate for phase shift due to temperature changes in the goniometer.

The rotor of the goniometer consists of two coils 98, 100 in space quadrature with one another. The two voltages induced into the respective windings may be expressed as $E \cos \omega t \sin \theta$ and $E \cos \omega t \cos \theta$, where $\theta$ is the angle of shaft rotation. The output voltage of the system taken at the junction of resistor 102 and condenser 104 is $$e_0 = \frac{E \cos \omega t \sqrt{\cos^2 \theta + \frac{\sin^2 \theta}{\omega^2 R^2 C^2}} \; \lfloor \tan^{-1}(1/\omega RC \tan \theta)}{\sqrt{1 + 1/\omega^2 R^2 C^2} \; \lfloor \tan^{-1} 1/\omega RC} \quad (1)$$

where $R$=the total resistance in ohms of fixed resistor 102 and variable resistor 106, and $C$=the capacitance in farads of condenser 104.

If $\omega RC = 1$, Equation 1 becomes $$e_0 = E/\sqrt{2} \cos (\omega t - 45° + \theta) \quad (2)$$

Thus, when $\omega RS = 1$ the output voltage at terminals 108 (Fig. 6) is seen to have a constant amplitude and a phase angle proportional to $\theta$.

It has been found that differences in ambient temperature cause differences in the value of $\omega RC$. Thus, even though $\omega RC$ is 1 at one particular temperature, temperature changes will cause change in the value of $\omega RC$ and this in turn will cause errors in the reading of the altimeter. Calculations have been made assuming a reasonable amount of temperature compensation of R and C and it has been found that a change in temperature of 100° produces a maximum error of approximately 7 minutes of arc. This corresponds to a maximum altitude error of approximately 26 ft. and occurs at 20,000 ft. altitude and 60,000 ft. altitude, respectively. The differences in temperature also cause small differences in amplitude of the output wave of the delay loop containing the goniometer but this is unimportant since the bi-directional switch 38 is not sensitive to these small differences in amplitude.

The phase error discussed above can be readily compensated for by enclosing resistors 102 and 106 and condenser 104 in a constant temperature oven. Use of an oven is also advantageous in that it may also be used to enclose the crystal controlling oscillator 10 (Fig. 1) thereby reducing to a very minimum errors caused by frequency drift of the oscillator.

Isolation amplifier 18 includes four triodes 110, 112, 114 and 116. The function of the amplifiers is to provide a stabilized gain and a high impedance to the output of the goniometer thereby preventing loading of the goniometer.

Figure 7:
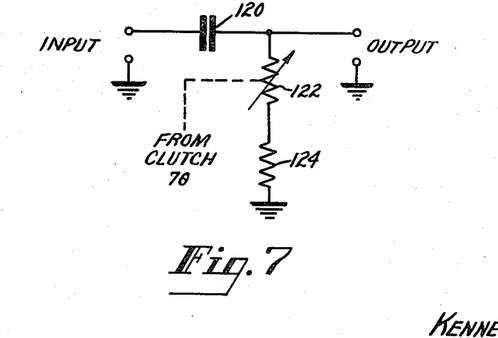
Figures 7 and 8 are schematic circuit diagrams of other portions of the invention shown in block form in Figures 1 and 3.

Figure 7 illustrates the phase shifter 20. It includes a capacitor 120, a variable resistor 122 and a fixed resistor 124. It has been found that a range of phase shift of 2° corresponding to 444 ft. of altitude is adequate for the system of the invention. Of course, for other types of systems a different range of phase shift may be employed. The phase shift chosen, in an embodiment of the invention actually built, was from 4 to 6° since in this range of variation the amplitude change was found to be negligible. Actual values of components employed were, in their quiescent condition, condenser 120=0.0025 microfarad, resistor 124=100,000 ohms and resistor 122=48,500 ohms. As can be seen from Figure 7, variable resistor 122 is driven by the output shaft of magnetic clutch 76. Resistor 122 may have a total value of 100,000 ohms for its maximum value whereby 48,500 ohms is approximately one half turn of the resistor. The circuit is so arranged that the amount of rotation of shaft 44 necessary to adjust the phase shifter 20 during calibration is equal to the amount of rotation of shaft 44 necessary to make altitude indicators 50 and 52 indicate the correct altitude during calibration.

Figure 8:
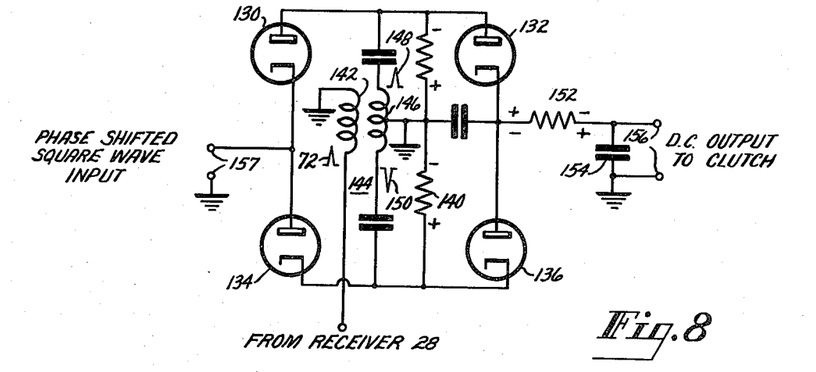

The bi-directional switch is shown in Figure 8. It includes four diodes 130, 132, 134 and 136. The phase shifted square wave is applied to the common cathode anode connection of diodes 130 and 134. The pulses from receiver 28 are applied to the primary winding 142 of transformer 144. The secondary winding 146 is so wound that it provides output pulses 148 and 150 with the polarities as indicated. Because of the pulses there is developed across resistors 138 and 140 voltages of the polarity indicated. These effectively maintain diodes 132 and 136 cut off. When subsequent pulses occur, the bias on each diode is overcome and the diodes then act as low impedances and permit the potential of the phase shifted input square wave to be reproduced at the output terminals of the diodes. The resistor and capacitor network 152, 154 immediately before the output terminals 156 maintains any output voltage developed for the entire period of time between pulses. Thus, it can be seen that the circuit truly acts as a bi-directional switch. It is turned on only for the duration of the pulses and during these short intervals of time whatever voltage is present at the input terminals 157 will appear at the output terminals 156. This voltage will be zero, positive, or negative, depending upon whether the pulses are in time coincidence with the center of the lagging edge of the square wave (see Figs. 5d' and 5e') below this center point or above this center point respectively. When pulse 72 (Fig. 5e') is in time coincidence with the center portion of wave edge 74, the two waves are said to be "in phase."

Figure 10:
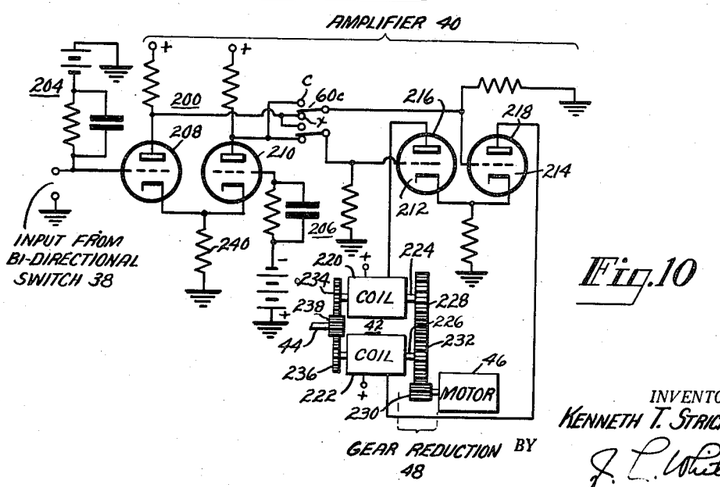
Figure 10 is a schematic circuit diagram of the direct current amplifier and associated circuits shown in block form in Figures 1, 3 and 9.

Figure 10 illustrates the amplifier 40, counter-rotatable magnetic clutches 42 and various associated circuits. The input stages of the amplifier include a pair of triodes 200, 202. In their quiescent condition these triodes are so biased by their respective grid biasing circuits 204 and 206 that they pass equal amounts of current, whereby the voltages to the respective anodes 208 and 210 of the two triodes are equal. These output voltages are applied to the control grids 212 and 214 of triodes 216, 218. The respective output currents of triodes 216 and 218 are passed through clutch coils 220 and 222 in the anode circuits of the triodes. Motor 46 continuously drives the input shafts 224, 226 of the respective ones of the counter-rotatable clutches through gear reduction 48. It will be noted that the gears are so arranged that one, for example 228, rotates clockwise in response to a given direction of rotation of pinion 230 whereas the other, 232, rotates counter-clockwise in response to the same direction of rotation of pinion 230. Output shaft 44 is driven in one direction by driving gear 234 and in the opposite direction by driving gear 236, both of said gears always engaging driven gear 238.

In operation, in the absence of a signal from bi-directional switch 38, tubes 200 and 202 conduct equal amounts of current whereby triodes 216 and 218 also conduct equal amounts of current. Equal amounts of current are also passed through coils 220 and 222, whereby the amount of magnetic coupling between the input and output shafts of one of the magnetic clutches is exactly the same as the amount of magnetic coupling between the input and output shafts of the other magnetic clutch. The result is that gear 234 attempts to drive gear 238 in one direction and gear 236 attempts to drive gear 238 in the opposite direction. However, since the driving torque of gear 234 is the same as that of gear 236 in view of the equal amounts of magnetic coupling provided by coils 220 and 222, output gear 238 does not turn.

An input signal of one polarity, for example positive, applied to the control grid of triode 200 causes that triode to conduct more heavily and the voltage at its anode 208 to become more negative. When triode 200 conducts more current there is developed across common cathode resistor 240 a greater amount of bias voltage. Consequently, triode 202 conducts less heavily and its anode becomes more positive. As a result of the above, control grid 212 of the triode 216 is driven more positive and control grid 214 of triode 218 is driven more negative. Triode 216 now conducts more current and triode 218 conducts less current whereby coil 220 provides a greater amount of magnetic coupling between its input and output shafts than coil 222. The result is that gear 234 drives output gear 238.

When the signal from bi-directional switch 38 reverses its polarity it can readily be shown that there is more current through coil 222 than coil 220 whereby output gear 236 drives gear 238.

It is believed to be unnecessary to give further details of the various blocks shown in Figures 1 and 3 since they are all conventional. Thus the squaring circuits may consist of amplifiers with diode clippers or similar square wave output circuits. The differentiators are conventional RC differentiators. The motor, gear reduction assemblies and other such circuit components are all conventional as are the radar transmitter 26, radar receiver 30 and receiver blanking circuit 28.

Figure 9:
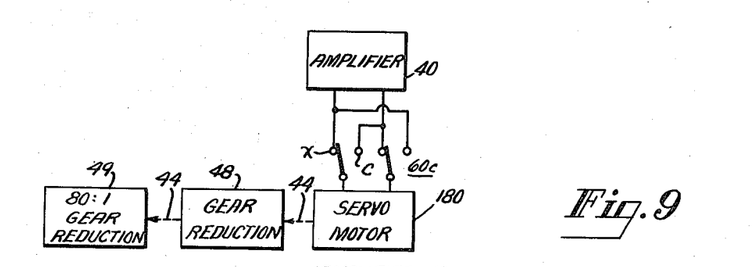
Figure 9 is a block circuit diagram of a portion of another embodiment of the invention.

The arrangement employed to drive the goniometer is shown in Figures 1 and 3 as including a power source, constant speed motor and a pair of counter-rotatable magnetic clutches. Other arrangements are possible. For example, if desired, the direct current amplifier 40 may be used to drive a D.C. motor in the servo loop itself. This will eliminate the need for power source 44, constant speed motor 46 and the two counter-rotatable magnetic clutches 42. An arrangement of this type is shown in block form in Figure 9. Direct current amplifier 40 applies a control signal, when one is present, to servo motor 180. The servo motor drives the 80-to-1 gear reduction through gear reduction 48 which is now interposed between the servo motor and the 80-to-1 gear reduction. The remainder of the arrangement is as shown in Figures 1 and 3 and therefore not illustrated in Figure 9. The direction of servo motor rotation depends, of course, on the polarity of the output signal of the direct current amplifier. A positive output signal, for example, may cause clockwise motor rotation and a negative output signal counter-clockwise rotation. If the amplifier shown in Figure 10 is employed, coils 220 and 222 may be the windings of a direct current servo motor. The same amount of current through both of said windings results in no mechanical output from the servo motor whereas when there is more current through one winding than the other there is a mechanical output of the motor in a direction dependent upon which one of the windings conducts more current. Since this arrangement, per se, is conventional and well known, it is believed to be unnecessary to describe it in further detail.

The timing scheme shown including the goniometer is also only illustrative of the invention and not meant to be limiting. Other well-known timing arrangements may be employed to measure the delay interval between the transmitted pulse and received echo. One well-known arrangement, for example, includes a so-called linear wave generator which drives a steep wave generator, the bi-directional switch comparing the phase of the steep wave with that of the received echo. An arrangement of this type is described in detail in application Serial No. 459,146, filed September 29, 1954, in the name of D. H. Westwood. In the arrangement of the above type the feedback loop would, during calibration, adjust the reference voltage level of the steep wave generator.

It is to be understood that the invention described herein is applicable to continuous wave object detection systems as well as to pulse type systems. Moreover, the invention is useful in the audio as well as radio frequency regions of the spectrum.

What is claimed is:

1. An electrical circuit comprising, connection means for a source of reference waves; a pair of delay loops, one including means providing an approximately fixed delay subject to minor variation and introducing a total delay which is the sum of said fixed delay and an unknown changeable delay, and the second including means providing an approximately fixed delay subject to minor variation and means providing a known adjustable delay, both of said loops being connected to receive said reference waves; comparison circuit means connected to receive the respective outputs of said loops for driving from said outputs, when they are different in phase, a control signal having a sense which is a function of the sense of said difference in phase; feedback circuit means connected to receive said control signal and responsive thereto, and coupled to said known adjustable delay means for changing the delay thereof in accordance with said control signal in the proper sense and magnitude to reduce to zero the control signal output of said comparison circuit means; and means for rendering the delay introduced by said fixed delay means of one loop equal to the delay introduced by said fixed delay means of the other loop comprising means for effectively by-passing said known adjustable delay means and eliminating said unknown changeable delay, whereby, when the fixed delay introduced in one loop is unequal to the fixed delay introduced in the other loop said comparison circuit means provides an output control signal, and phase delay means in one of said loops connected to said feedback circuit means during the time said fixed delays are being compared and responsive to said control signal for adjusting the delay in said last-named one loop until the fixed delays introduced by both loops are equal.

2. An electrical circuit comprising, connection means for a source of reference waves; a pair of delay loops, one including means providing an approximately fixed delay subject to minor variation and introducing a total delay which is the sum of said fixed delay and an unknown changeable delay, and the second including means providing an approximately fixed delay subject to minor variation and means providing a known adjustable delay, both of said loops being connected to receive said reference wave; comparison circuit means connected to receive the respective outputs of said loops for deriving from said outputs, when they are different in phase, a control signal having a sense which is a function of the sense of said difference in phase; feedback circuit means connected to receive said control signal and responsive thereto, and coupled to said known adjustable delay means for changing the delay thereof in accordance with said control signal in the proper sense and magnitude to reduce to zero the control signal output of said comparison circuit means; and means for rendering the delay introduced by said fixed delay means of one loop equal to the delay introduced by said fixed delay means of the other loop comprising means for effectively periodically by-passing said known adjustable delay means and eliminating said unknown changeable delay, whereby, when the fixed delay introduced in one loop is unequal to the fixed delay introduced in the other loop said comparison circuit means provides an output control signal, and phase delay means in one of said loops connected to said feedback circuit means during the time said fixed delays are being compared and responsive to said control signal for adjusting the delay in said last-named one loop until the fixed delays introduced by both loops are equal.

3. An electrical circuit comprising, connection means for a source of reference waves; a pair of delay loops, one including means providing an approximately fixed delay subject to minor variation and introducing a total delay which is the sum of said fixed delay and an unknown changeable delay, and the other including means providing an approximately fixed delay subject to minor variation and goniometer means providing a known adjustable delay, both of said loops being connected to receive said reference waves; comparison circuit means connected to receive the respective outputs of said loops for deriving from said outputs, when they are different in phase, a control signal having a sense which is a function of the sense of said difference in phase; feedback circuit means connected to receive said control signal and responsive thereto, and uncoupled to said known adjustable delay means for changing the delay thereof in accordance with said control signal in the proper sense and magnitude to reduce to zero the control signal output of said comparison circuit means; and means for rendering the delay introduced by said fixed delay means of one loop equal to the delay introduced by said fixed delay means of the other loop comprising means for effectively by-passing said known adjustable delay means and eliminating said unknown changeable delay, whereby, when the fixed delay introduced in one loop is unequal to the fixed delay introduced in the other loop said comparison circuit means provides an output control signal, and phase delay means in one of said loops connected to said feedback circuit means during the time said fixed delays are being compared and responsive to said control signal for adjusting the delay in said last-named one loop until the fixed delays introduced by both loops are equal.

4. An electrical circuit comprising, connection means for a source of reference waves; a pair of delay loops, one including means providing an approximately fixed delay subject to minor variation and introducing a total delay which is the sum of said fixed delay and an unknown changeable delay, and the other including means providing an approximately fixed delay subject to minor variation and means providing a known adjustable delay, both of said loops being connected to receive said reference waves; bi-directional switch means connected to receive the respective outputs of said loops for deriving from said outputs, when they are different in phase, a control signal having a sense which is a function of the sense of said difference in phase; feedback circuit means connected to receive said control signal and responsive thereto, and coupled to said known adjustable delay means for changing the delay thereof in accordance with said control signal in the proper sense and magnitude to reduce to zero the control signal output of said bi-directional switch means; and means for rendering the delay introduced by said fixed delay means of one loop equal to the delay introduced by said fixed delay means of the other loop comprising means for effectively by-passing said known adjustable delay means and eliminating said unknown changeable delay, whereby, when the fixed delay introduced in one loop is unequal to the fixed delay introduced in the other loop said bi-directional switch means provides an output control signal, and phase delay means in one of said loops connected to said feedback circuit means during the time said fixed delays are being compared and responsive to said control signal for adjusting the delay in said last-named one loop until the fixed delays introduced by both loops are equal.

5. An electrical circuit comprising, connection means for a source of reference waves; a pair of delay loops, one including means providing an approximately fixed delay subject to minor variation and introducing a total delay which is the sum of said fixed delay and an unknown changeable delay and the second including means providing an approximately fixed delay subject to minor variation and means providing a known adjustable delay, both of said loops being connected to receive said reference waves; comparison circuit means connected to receive the respective outputs of said loops for deriving from said outputs, when they are different in phase, a control signal having a sense which is a function of the sense of said difference in phase; constant speed motor means; normally deenergized first magnetic clutch means of the type which when actuated by a control signal in one sense permits a direction of rotation in one sense and when actuated by a control signal of an opposite sense permits a direction of rotation of an opposite sense, said magnetic clutch means being mechanically coupled between said constant speed motor and said means providing a known adjustable delay; feedback circuit means including said magnetic clutch means connected to receive said control signal and responsive thereto for actuating said clutch means in the proper sense to permit said motor to adjust said known adjustable delay means in the correct sense to reduce the control signal output of said comparison circuit means to zero; and means for rendering the delay introduced by said fixed delay means of one loop equal to the delay introduced by said fixed delay means of the other loop comprising means for effectively eliminating said known adjustable delay means; means for by-passing said unknown changeable delay; phase shifting means in one of said loops; a normally deenergized second magnetic clutch means mechanically coupled to said phase shifting means for adjusting the phase thereof when energized; and means for actuating said second magnetic clutch means and mechanically coupling said constant speed motor thereto simultaneously with the by-passing of said known and unknown adjustable delay means, whereby when the fixed delays introduced by both loops are equal the control signal output of said comparison circuit means is reduced to zero.

6. An electrical circuit as set forth in claim 5, and further including a direct reading indicator mechanically connected to the output means of said first-named magnetic clutch means.

7. An electrical circuit as set forth in claim 6, and further including means for reversing the sense of said control signal applied to said first magnetic clutch means solely during the time the fixed delays of both of said loops are being made equal to one another, said second magnetic clutch means being arranged to rotate said phase shifting means in the correct sense to reduce the difference in fixed delays provided by said loops to zero in response to the corresponding reverse direction of rotation of said first magnetic clutch means.

8. In a pulse-echo system of the type including a central time base providing a stable sinusoidal reference signal; a first delay loop connected to receive said signal including means for converting said signal to triggering pulses, transmitter means actuated by said triggering pulses for transmitting pulses to a target, and receiver means for receiving said pulses after reflection from a target; a second delay loop connected to receive said reference wave including adjustable phase shifting means for shifting the phase of said reference wave, and square wave circuit means for converting said reference wave to a square wave; and a comparison circuit connected to receive said square wave and said echo pulses for comparing the phase of a given portion of said square wave with that of said echo pulses: an arrangement for calibrating said pulse-echo system comprising, in combination, means for effectively by-passing the adjustable phase shifting means of said second loop; means for applying the transmitted pulses directly to said receiver means; means connected to receive the output of said comparison circuit means for deriving therefrom, when the two inputs thereto are out of phase, a control signal having a sense which is a function of the sense of said difference in phase; adjustable delay means in one of said loops; and feed-back circuit means responsive to said control signal for adjusting said adjustable delay means in the proper sense and magnitude to reduce the control signal output of said comparison circuit means to zero volts.

9. In a pulse-echo system as set forth in claim 8, said feedback circuit means comprising a direct current motor responsive to said control signal for rotating in one direction in response to a control signal of one polarity and in an opposite direction in response to a control signal of the opposite polarity.

10. In a pulse-echo system as set forth in claim 9, means operative solely during the calibration of said pulse-echo system for reversing the polarity of the control signal applied to said direct current motor during the calibration interval.

11. In a pulse-echo system as set forth in claim 8, said comparison circuit comprising a bi-directional switch.

12. In a pulse-echo system as set forth in claim 8, said adjustable phase shifting means in said second loop comprising a goniometer.

13. In a pulse-echo system as set forth in claim 12, said adjustable delay means comprising a resistor-condenser phase shifter.

14. An electrical circuit comprising, connection means for a source of reference waves; a pair of delay loops, one including means providing an approximately fixed delay subject to minor variation and introducing a total delay which is the sum of said fixed delay and an unknown changeable delay, and the second including means providing an approximately fixed delay subject to minor variation and means providing a known adjustable delay, both of said loops being connected to receive said reference waves; and means for rendering the fixed delays introduced by each of the loops substantially the same including a second adjustable delay device in series circuit with one of said loops, means for effectively by-passing the unknown changeable delay of said one loop, means for effectively by-passing the known adjustable delay of said other loop, comparison circuit means connected to receive the respective outputs of said loops for deriving from said outputs, when they are different in phase, an output signal, and means responsive to said output signal for adjusting said second adjustable delay device.

15. An electrical circuit as set forth in claim 14, further including means interconnecting, during the time said second adjustable delay device is being adjusted, said second adjustable delay device and said means providing a known adjustable delay, for permitting simultaneously adjustment of said means providing a known adjustable delay and said second adjustable delay device.

16. In an object detection system of the type including means for transmitting wave energy to a target, means for receiving a portion of said energy after reflection from said target, means for measuring the time interval between the transmission and reception of said energy, and a direct reading device for directly indicating said time interval, the reading on said direct reading device being subject to error in response to changes in the fixed delays introduced by said system, in combination, calibration means operatively associated with said system for introducing into said system, during at least one restricted period of the operation thereof, a compensating fixed delay of the proper sense to eliminate said error; and means coupled to said calibration means and to said direct reading device for rendering the reading on the latter approximately accurate during said restricted period of the operation of said system.

17. In a direct-reading, pulse type radio altimeter of the type including means for transmitting radio frequency pulses to the terrain below, means for receiving echoes reflected from said terrain, means for measuring the time interval between the transmission of said pulses and reception of said echoes, and a direct reading altitude indicator coupled to said measuring means for directly indicating said time interval, the reading on said indicator being subject to minor amounts of error in response to minor changes in the fixed delays introduced by the radio altimeter itself, in combination, calibration means operatively associated with said altimeter for introducing therein, during periodic periods of the operation thereof, compensating fixed delays in the proper sense to eliminate said minor amounts of error; and means coupled to said calibration means and to said indicator for rendering the altitude reading on the latter approximately accurate during said periodic periods of operation of said altimeter.

References Cited in the file of this patent

UNITED STATES PATENTS

| | | |
|---|---|---|
| 2,433,681 | Blumlein | Dec. 30, 1947 |
| 2,655,651 | Allen | Oct. 13, 1953 |
| 2,713,160 | Trachlenberg et al. | July 12, 1955 |